(12) United States Patent
Relan

(10) Patent No.: US 8,914,959 B2  
(45) Date of Patent: Dec. 23, 2014

(54) APPARATUS AND METHOD OF ASSEMBLING A PISTON ON A SHAFT OVER A LIP SEAL

(75) Inventor: Krishna K. Relan, Canton, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 1117 days.

(21) Appl. No.: 12/874,482

(22) Filed: Sep. 2, 2010

(65) Prior Publication Data

US 2010/0325856 A1 Dec. 30, 2010

Related U.S. Application Data

(62) Division of application No. 11/695,208, filed on Apr. 2, 2007, now Pat. No. 7,788,778.

(51) Int. Cl.
| | |
|---|---|
| *B23P 19/02* | (2006.01) |
| *B23P 19/08* | (2006.01) |
| *B25B 27/00* | (2006.01) |
| *F16D 25/0638* | (2006.01) |
| *F16D 25/10* | (2006.01) |
| *F16D 25/12* | (2006.01) |
| *F16D 48/02* | (2006.01) |

(52) U.S. Cl.
CPC ........... *B23P 19/084* (2013.01); *B25B 27/0028* (2013.01); *F16D 25/0638* (2013.01); *F16D 25/10* (2013.01); *F16D 25/12* (2013.01); *F16D 2048/0212* (2013.01)
USPC ............................. 29/235; 29/559

(58) Field of Classification Search
USPC ....................... 29/559, 281.1; 53/474, 484, 75
See application file for complete search history.

(56) References Cited

U.S. PATENT DOCUMENTS

| | | | | |
|---|---|---|---|---|
| 3,073,088 | A | * | 1/1963 | White ............................... 53/76 |
| 5,417,031 | A | * | 5/1995 | Bankuty et al. ............... 53/331.5 |
| 5,887,328 | A | | 3/1999 | Rydin et al. |
| 6,012,209 | A | | 1/2000 | Whetstone |
| 6,148,493 | A | | 11/2000 | Pixley et al. |
| 6,360,415 | B1 | | 3/2002 | Wada et al. |
| 6,519,913 | B2 | * | 2/2003 | Higashizaki et al. ............. 53/75 |
| 6,886,227 | B1 | | 5/2005 | Hedrick |
| 7,478,464 | B2 | | 1/2009 | Kang |
| 8,646,245 | B2 | * | 2/2014 | Behar et al. ...................... 53/420 |
| 2004/0222224 | A1 | * | 11/2004 | Plester ..................... 220/203.17 |
| 2008/0235931 | A1 | * | 10/2008 | Relan .............................. 29/428 |
| 2010/0325856 | A1 | * | 12/2010 | Relan .............................. 29/235 |

* cited by examiner

*Primary Examiner* — Lee D Wilson

(57) ABSTRACT

A method and apparatus for installing a piston over a lip seal on a shaft includes a cylinder or primary force and a weight member or secondary force. The primary force and secondary force are coupled by a resilient member, which will permit the secondary force to retract from the assembly process when the force needed to complete the assembly is above a predetermined value.

14 Claims, 3 Drawing Sheets

US 8,914,959 B2

APPARATUS AND METHOD OF ASSEMBLING A PISTON ON A SHAFT OVER A LIP SEAL

CROSS-REFERENCE TO RELATED APPLICATIONS

This application is a divisional application of U.S. application Ser. No. 11/695,208 filed on Apr. 2, 2007. The disclosure of the above application is incorporated herein by reference.

TECHNICAL FIELD

This invention relates to fluid-operated pistons and, more particularly, to a method for mounting the piston on a shaft over a lip seal.

BACKGROUND

Many automatic transmissions have fluid-operated clutches which have the inner surface thereof slidingly sealed by a lip type seal. The lip seal is installed in a groove formed in a shaft member and the piston is installed over the seal. During installation, it has been found that under certain circumstances, the lip seal will tend to roll and therefore be ineffective as a sealing member in the transmission.

Generally, this error is discovered during testing of the transmission and/or clutch pistons prior to removal from the plant installation into an automobile. However, under some instances, the lip seal is partially rolled and the leakage is slow, such that the error is not found until after the vehicle has been in operation for a while.

SUMMARY

It is an aspect of the present invention to provide an improved method of installing equipment over a lip seal on a shaft member.

In one aspect of the present invention, the lip seal is installed in a groove in the shaft and the piston is forced over this lip seal and onto the shaft by a piston and weight.

In another aspect of the present invention, the piston is operable on the weight through a spring member.

In yet another aspect of the present invention, the weight member is operable on the piston through a plurality of rods.

In still another aspect of the present invention, if the installation force of the piston over the lip seal exceeds a predetermined value, the weight is forced against the direction of motion of the piston to indicate the ineffective installation thereof.

DESCRIPTION

Figure 1:
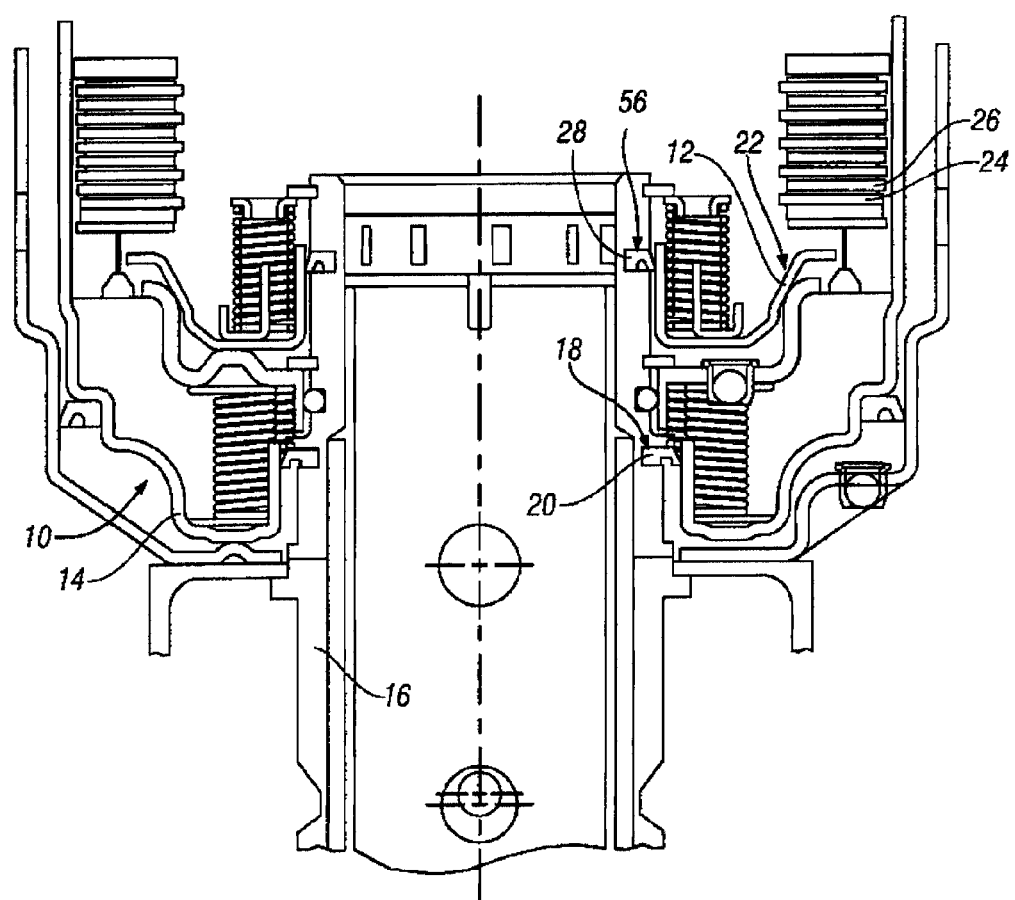
FIG. 1 is an elevational view describing a portion of a transmission assembly.
Figure 2:
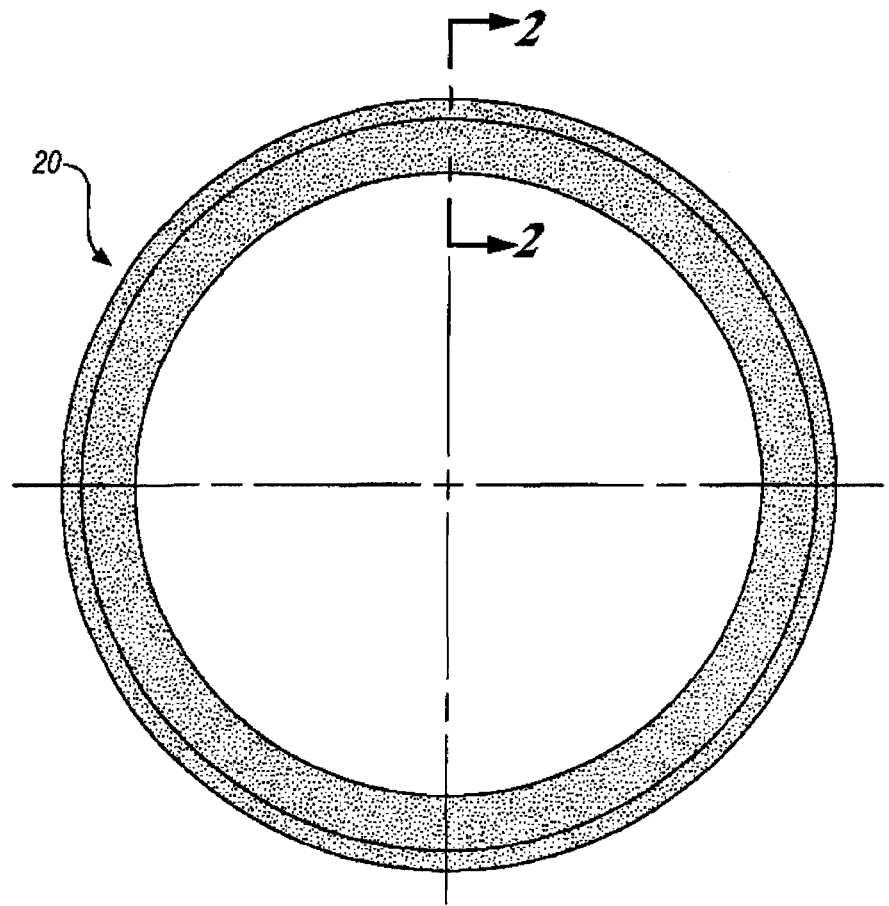
FIG. 2 is an elevational view of a lip seal.
Figure 3:
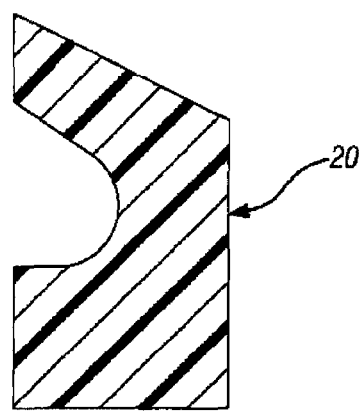
FIG. 3 is a view taken along line 2-2 of FIG. 2.

Power transmissions often employ fluid-operated clutches, such as 10 and 12, shown in FIG. 1. The fluid clutch 10 includes a piston 14, which is slidably disposed on a shaft 16. The shaft 16 has formed therein a groove 18 in which is positioned a lip seal 20, such as that shown in FIGS. 2 and 3. The clutch 12 also includes a piston 22 and a plurality of friction plates or discs 24 and 26. The piston 22 is slidably disposed on the shaft 16 and is sealed at the inner surface thereof by a lip seal 28, which is similar to the lip seal 20. As can be seen in the drawing, the lip seal 28 has a smaller diameter than the lip seal 20.

Figure 4:
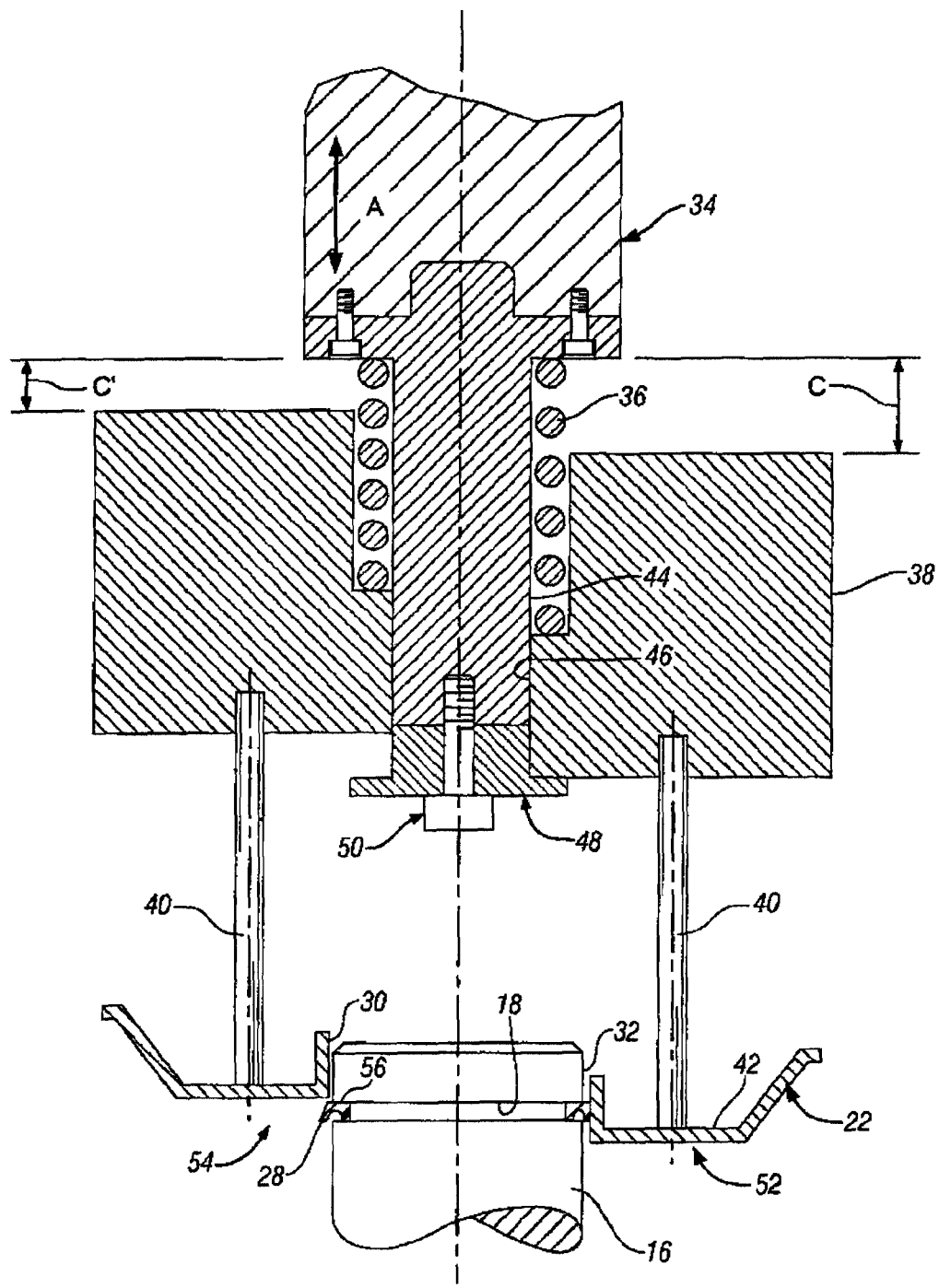
FIG. 4 is a diagrammatic representation of the assembly process for installing the piston over a lip seal.

The piston 22 is installed over the shaft 16, as shown in FIG. 4. This installation occurs before the shaft and piston assembly are placed inside the transmission or before the completion of the clutch assembly. The piston 22 has an inner circumference or opening 30, which is larger than outer diameter 32 of the shaft 16.

An air or hydraulic cylinder 34 is employed to impose a force on the piston during assembly. The cylinder 34 operates through a spring 36, which in turn presents a force to a weight member 38. The weight 38 has a plurality of pins 40 associated therewith. The pins 40 abut an annular surface 42 of the piston 22. The cylinder 34 has an extension 44, which passes through an opening 46 in the weight 38 and is positioned thereon by a spacer 48 and a screw or threaded fastener 50.

During assembly of the piston 22 over the lip seal 28, the cylinder 34 is moved in the direction of Arrow A thereby imposing a force through the spring 36 on the weight 38. The weight itself also imposes a force and the addition of these forces urge the piston 22 to pass over the lip seal 28, as shown on the right side 52 of FIG. 4. However, if the lip seal 28 has a larger resistance force, for example if it rolls out of the groove 56, the force required to move the piston across the seal 28 increases.

As seen on the left side 54 of FIG. 4, this increased force is large enough to cause the weight 38 to move upward relative to the cylinder 34 such that the weight 38 will separate from the spacer 48 and a gap C' between the weight 38 and the cylinder 34 is decreased from the normal value of the gap C. This reduction in the gap C is a visual indication that the lip seal is not properly installed and correction can be made immediately. Alternatively, the position of the weight 38 can be determined by conventional electronic sensors, which will supply a signal to the operator that the piston 22 has not been properly installed.

The spring 36 has a stored force which determines the minimum force at which the weight 38 will begin to reduce the gap C to the gap C'. By determining the force, which is normally required to insert the piston over the seal 28, the spring 36 can be properly designed. Thus, the assemblies would be conducted with a machine in which the load on the spring is either variable or it can be performed on separate machines.

The method of installing the piston comprises imposing a force to the piston from the cylinder 34 through the spring 36 and the weight 38. If the force necessary to install the piston over a seal exceeds the weight 38, the spring 36 will permit the weight to remain stationary and a gap between the cylinder and the weight will decrease signaling that the seal is not properly installed.

I claim:

1. A method of assembling a piston into an installed position on a shaft over a lip seal disposed on the shaft, the method comprising:

positioning the piston to be slidably disposed on the shaft and adjacent to the lip seal;

exerting an apply force on the piston with a weight member to translate the piston over the lip seal to the installed position, the weight member being in contact with the piston and having an annular portion, a plurality of pins being attached to the annular portion, the plurality of pins transferring the apply force to the piston;

monitoring a reaction force exerted by the lip seal on the piston as the piston translates into the installed position over the lip seal; and determining a condition of the lip seal based on the reaction force.

2. The method of claim 1 wherein determining the condition of the lip seal includes determining that the lip seal is properly positioned when the reaction force exerted by the lip seal as the piston translates into the installed position does not exceed a predetermined expected reaction force exerted by a properly positioned lip seal.

3. The method of claim 1 wherein determining the condition of the lip seal includes determining that the lip seal is not properly positioned when the reaction force exerted by the lip seal as the piston translates into the installed position exceeds a predetermined expected reaction force exerted by a properly installed lip seal.

4. The method of claim 1 wherein exerting the apply force includes exerting the apply force on the piston through a resilient member and in a direction toward the lip seal and toward the installed position of the piston.

5. The method of claim 1 wherein exerting the apply force includes exerting the apply force on the piston through a spring to translate the piston over the lip seal to the installed position.

6. The method of claim 5 wherein monitoring the reaction force includes monitoring the reaction force exerted by the lip seal on the piston as the piston translates into the installed position by monitoring a compression distance of the spring that is indicative of the reaction force.

7. The method of claim 6 wherein determining the condition of the lip seal includes determining a condition of the lip seal based on the reaction force by comparing the compression distance of the spring with a predetermined compression distance of the spring.

8. The method of claim 6 wherein monitoring the compression distance of the spring includes visually inspecting the compression distance of the spring relative to an initial compression of the spring before the apply force is exerted on the piston.

9. The method of claim 6 wherein monitoring a compression distance of the spring includes monitoring an output of an electronic sensor that determines the compression distance of the spring.

10. A method of assembling a piston into an installed position on a shaft over a lip seal disposed on the shaft, the method comprising:

positioning the piston to be slidably disposed on the shaft and adjacent to the lip seal;

exerting an apply force on the piston through a spring and a weight member to translate the piston over the lip seal to the installed position, the weight member being in contact with the piston and having an annular portion, a plurality of pins being attached to the annular portion, the plurality of pins transferring the apply force to the piston;

monitoring a reaction force exerted by the lip seal on the piston as the piston translates into the installed position over the lip seal by monitoring a compression distance of the spring that is indicative of the reaction force; and determining a condition of the lip seal based on the reaction force by comparing the compression distance of the spring with a predetermined compression distance.

11. The method of claim 10 wherein monitoring the compression distance of the spring includes visually inspecting the compression distance of the spring relative to an initial compression of the spring before the apply force is exerted.

12. The method of claim 10 wherein monitoring a compression distance of the spring includes monitoring an output of an electronic sensor that determines the compression distance of the spring.

13. The method of claim 10 wherein determining a condition of the lip seal includes determining that the lip seal is properly positioned on the shaft when the compression of the spring is less than a predetermined expected compression amount for an improperly positioned lip seal.

14. The method of claim 10 wherein determining a condition of the lip seal includes determining that the lip seal is not properly positioned on the shaft when the compression of the spring is greater than or equal to a predetermined expected compression amount for an improperly positioned lip seal.

* * * * *